(12) United States Patent
Haacke et al.

(10) Patent No.: US 9,406,498 B2
(45) Date of Patent: Aug. 2, 2016

(54) HIGH EFFICIENCY LIGHTING ASSEMBLY

(75) Inventors: Michael Haacke, Aachen (DE); Lars Dabringhausen, Baesweiler (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 297 days.

(21) Appl. No.: 13/500,666

(22) PCT Filed: Sep. 27, 2010

(86) PCT No.: PCT/IB2010/054335
§ 371 (c)(1),
(2), (4) Date: Apr. 6, 2012

(87) PCT Pub. No.: WO2011/042830
PCT Pub. Date: Apr. 14, 2011

(65) Prior Publication Data
US 2012/0194093 A1    Aug. 2, 2012

(30) Foreign Application Priority Data
Oct. 9, 2009   (EP) .................................... 09172656

(51) Int. Cl.
*H05B 41/16* (2006.01)
*H01J 61/82* (2006.01)
(Continued)

(52) U.S. Cl.
CPC ............... *H01J 61/827* (2013.01); *H01J 61/34* (2013.01); *H05B 41/2885* (2013.01); *Y02B 20/202* (2013.01)

(58) Field of Classification Search
CPC ......... H05B 31/04; H05B 41/24; H01J 61/18; H01J 9/14; H01J 17/20; H01J 61/30
USPC .................. 313/643, 571, 638, 309; 315/246
See application file for complete search history.

(56) References Cited

U.S. PATENT DOCUMENTS 3,624,447 A     11/1971 Young
4,020,377 A *   4/1977 Popp et al. .................... 313/112
(Continued)

FOREIGN PATENT DOCUMENTS

CN          101010776 A       8/2007
EP          0784334 A1        7/1997
(Continued)

OTHER PUBLICATIONS

EPO as ISA, International Search Report and Written Opinion mailed May 27, 2011 from International Application No. PCT/IB2010/054335 filed Sep. 27, 2010, 21 pages.
(Continued)

*Primary Examiner* — Thai Pham (57) ABSTRACT

A lighting assembly (100) includes an electronic driver circuit (110) and a discharge lamp (10). The discharge lamp (10) is driven with a steady-state average power of 20-30 W. It includes a discharge vessel (20) of a maximum inner dimension ID of less than 3 mm with two electrodes (24). A discharge vessel filling comprises a rare gas and a metal halide composition provided in an amount per volume of the discharge vessel (20) of less than 13.2 µg/µl. Electrical energy is supplied as an alternating current $I_L$ where pulses (150a-150d) are superimposed. The pulses occur in a time interval of 20% of a half-cycle time before or after a polarity change of the alternating current $I_L$. During the pulses the current $I_L$ reaches the current value of at least 1.2 times the RMS value of the current $I_L$.

15 Claims, 5 Drawing Sheets

(51) Int. Cl.
  *H01J 61/34* (2006.01)
  *H05B 41/288* (2006.01)

(56) References Cited

U.S. PATENT DOCUMENTS

| | | | |
|---|---|---|---|
| 4,518,891 A * | 5/1985 | Howard, Jr. | 313/398 |
| 5,212,424 A * | 5/1993 | Russell et al. | 313/562 |
| 6,504,323 B2 * | 1/2003 | Yuda et al. | 315/307 |
| 6,639,341 B1 * | 10/2003 | Sakai et al. | 313/25 |
| 7,671,537 B2 * | 3/2010 | Geijtenbeek et al. | 313/640 |
| 8,421,361 B2 * | 4/2013 | Chen et al. | 315/151 |
| 2002/0027421 A1 | 3/2002 | Kaneko | |
| 2005/0237004 A1 | 10/2005 | Bonigk | |
| 2006/0216207 A1 * | 9/2006 | Lehto | 422/100 |
| 2006/0255742 A1 * | 11/2006 | Haacke et al. | 313/641 |
| 2007/0253203 A1 | 11/2007 | Kubon et al. | |
| 2008/0093993 A1 | 4/2008 | Tu | |
| 2008/0185974 A1 * | 8/2008 | Pollmann-Retsch | 315/289 |
| 2009/0115341 A1 | 5/2009 | Nijhof | |
| 2009/0166584 A1 * | 7/2009 | Shimooka et al. | 252/301.4 F |
| 2010/0045184 A1 | 2/2010 | Deguchi | |
| 2010/0141138 A1 * | 6/2010 | Haacke et al. | 313/573 |
| 2011/0043123 A1 * | 2/2011 | Gilliard et al. | 315/248 |

FOREIGN PATENT DOCUMENTS

| | | |
|---|---|---|
| JP | H09199080 | 7/1997 |
| JP | 2008511956 | 4/2008 |
| JP | 2008147085 | 6/2008 |
| WO | 2006025027 A2 | 3/2006 |
| WO | 2008110967 A1 | 9/2008 |
| WO | 2009040709 A2 | 4/2009 |

OTHER PUBLICATIONS

First Office Action issued Jun. 4, 2014 from Chinese Patent Application No. 201080045463A.
Second Office Action issued Mar. 10, 2015 from Chinese Patent Application No. 201080045463.X.
Office Action mailed Jun. 2, 2015 from Japanese Patent Application No. 2012-532689.
Office Action mailed Feb. 2, 2016 from Japanese Patent Application No. 2012-532689.

* cited by examiner

HIGH EFFICIENCY LIGHTING ASSEMBLY

FIELD OF THE INVENTION

The present invention relates to a lighting assembly with an electronic driver circuit and a high-pressure gas discharge lamp, in particular for use in automotive front lighting.

BACKGROUND OF THE INVENTION

Discharge lamps, specifically HID (high-intensity discharge) lamps are used for a large area of applications where high luminous flux is required. Especially in the automotive field, HID lamps are used as vehicle headlamps.

A discharge lamp comprises a sealed discharge vessel, which may be made e.g. from quartz glass, with an inner discharge space. Two electrodes project into the discharge space, arranged at a distance from each other, to ignite an arc there between. The discharge space has a filling comprising a rare gas and further ingredients such as metal halides.

An important aspect today is energy efficiency. The efficiency of a discharge lamp may be measured as lumen output in relation to the electrical power used. In discharge lamps used today for automotive front lighting an efficiency of about 90 lumen per Watt (lm/W) is achieved at a steady state operating power of 35 Watt.

WO 2008/110967 describes a HID lamp for a vehicle headlight with reduced nominal power of 20-30 W. In an embodiment, a 25 W lamp has a discharge vessel of ellipsoid shape with electrodes provided at an optical distance of 4.2 mm. An inner diameter of the discharge vessel is 2.2 mm and an outer diameter is 5.5 mm. A filling is provided within the discharge vessel of Xenon at a cold pressure of 17 bar and metal halides 36 wt-% NaI, 24 wt-% ScI3 and 40 wt % ZnI2. An outer bulb is provided around the discharge vessel at a distance $d_2$ which is sealed a filled with a filling gas of reduced heat conductivity $\lambda$ measured at 800° C. A heat transition coefficient calculated as thermal conductivity $\lambda$ of the outer bulb filling gas divided by the distance $d_2$ between the discharge vessel and the outer bulb is below 150 W/(m²K).

SUMMARY OF THE INVENTION

It is an object of the present invention to provide a lighting assembly that allows energy efficient operation over a long lifetime.

Especially for the automotive field it would be desirable to drive a discharge lamp with lower nominal power than conventional 35 W lamps, e.g. in the range of 20-30 W, preferably 22-28 W, most preferably 25 W. If the lighting assembly could be designed to operate with high efficiency, such that sufficient total lumen output is achieved despite the lower electrical operating power, energy could be saved.

The inventors have recognized that using conventional electric driving schemes with existing lamp designs at lower nominal power will lead to drastically reduced efficiency. For example, a lamp which in steady state operation at 35 W has an efficiency of about 90 lm/W, has at 25 W only an efficiency of around 62 lm/W.

Thus, lamp designs adapted to the lower power are required. However, the inventors have found that optimization measures in the lamp design alone increase the risk of a limited lamp lifetime. For example, high gas pressure and strong thermal insulation may lead to a reduced lamp life.

According to the invention, there is thus provided a lighting assembly where an electronic driver circuit drives a lamp with special operating conditions, and where the lamp design is specially adapted therefor, such that at reduced average power, e.g. 25 W, high efficiency and a good lamp lifetime are achieved.

According to the invention, the lamp has a discharge vessel in which two electrodes project. Within the discharge space, there is provided a filling comprising a rare gas, preferably Xenon, and a metal halide composition. Preferably, the filling is at least substantially free of mercury, i.e. with no mercury at all or only unavoidable impurities thereof.

According to the invention, the metal halide composition may be provided in a concentration of less than 13.2 µg/µl of the volume of the discharge space. It is further preferred to use even less than 8 µg per µl. As will be shown in the preferred embodiments, even a small halide amount of 4-6.7 µg/µl may be used. Such limited amounts of metal halides lead to reduced reactivity, such that a longer lifetime is obtained.

According to the invention, the driver circuit drives the lamp in a special operating mode, which in the present context will be referred to as "pulsed operation". Generally, the lamp is driven with an alternating current, i.e. a current that periodically changes polarity. Preferred frequencies are 250-750 Hz, most preferred 300-450 Hz. While generally any basic waveform of an alternating current, such as a sinusoidal wave-form, could be used, it is preferred to supply a current in a rectangular waveform, where the current value changes rapidly around the polarity changes (commutation) and remains essentially constant during the remainder of each half period. It will of course be appreciated by the skilled person that an ideal rectangular waveform may not be fully obtained. Current values measured at the lamp will show finite edge steepness. Also, during the constant parts of a rectangular waveform, the actual current will not remain at exactly the same value. In the present context, the waveform of the lamp current will still be termed rectangular if the current remains essentially constant, i.e. within a +/−15%, preferably a +/−10% interval around an average value, for at least 70% of a half period and the polarity changes occur within the remaining 30% of each half period. Further preferred are rectangular waveforms with essentially constant current for 80% or more, most preferred for 90% or more of each half period.

In the pulsed operation scheme, current pulses are superimposed on the alternating current. At least one pulse is generated for each polarity change of the lamp current. The current pulse is located in time close to each polarity change. The center of the pulse lies in a time interval of 20% of the half cycle duration, which time interval includes the commutation of the lamp current. Thus, the time position of the pulse may be located within +/−20% of the half cycle time from the commutation. It should be noted that this definition relates to the pulse center, measured between the half maximum points of the pulse, as will be explained with the relation to the preferred embodiment, and does not necessitate that the full pulse is located within the time interval.

The pulse magnitude is defined in relation to the RMS (route mean square) value of the lamp current in the full cycle. According to the invention, the height of the current pulse, i.e. the maximum current value, is at least 1.2 times the RMS value of the lamp current. Further preferred are peak current values of at least 1.4 times the RMS value of the lamp current. The peak current may also be substantially higher, e.g. up to 5 times the RMS value. In most practical applications a peak current of up to 4 times the RMS value will be sufficient.

According to preferred embodiments, the pulses have a width (measured between half maximum points) of 1-25% of the half cycle time, further preferred 3-16%. The pulses may be provided before or after the polarity change. Preferably, two pulses of opposed polarity are provided for each commutation such that a first pulse is applied before and a second pulse (of reversed polarity) is applied after commutation.

It has surprisingly be found, that the pulsed driving scheme proposed according to the invention leads to a higher luminous flux generated by lamps of the type according to the present invention, driven at average operating power of 20-30 W, preferably 22-28 W, i.e. lower than conventional in automotive front lighting. For such a lamp driven at 25 W, an increase of lamp efficiency of about 5% was found.

Thus, the lighting assembly according to the invention, which combines a special pulsed operating mode with a lamp design suited for the reduced power range and further with a relatively low amount of halides allows to provide automotive front lighting with reduced electrical power and yet high luminous flux and good lifetime properties of the lamp.

According to a preferred embodiment, the lighting assembly has an efficiency which is equal to or higher than 75 lm/W, preferably higher than 80 lm/W, most preferred 85 lm/W or higher in a steady state operation at an electrical power of 25 W. In the present context, the efficiency measured in lm/W referred to is always measured at a burnt-in lamp, i.e. after the discharge lamp has been first started and operated for 45 minutes according to a burn-in sequence.

As will become apparent in connection with the preferred embodiments discussed below, there are several measures which may be used to obtain a lamp of high efficiency, even at a low operating power of 25 W. These measures refer on one hand to the discharge vessel itself, where a small inner diameter and a thin wall help to achieve high efficiency. On the other hand, this refers to the filling within the discharge space, which will be discussed below with regard to the amount and composition of the halides and the rare gas. Further, measures will be discussed directed to control the heat conduction via the outer enclosure so that the "coldest spot" temperature is kept sufficiently high to achieve high efficiency.

Generally, for operation at 20-30 W and preferably at 22-28 W, the inner diameter of the discharge vessel should be chosen relatively small, e.g. 2.0-2.5 mm. A minimum inner diameter of 2.0 mm is preferred to avoid too close proximity of the arc to the discharge vessel wall. According to a preferred embodiment, the discharge vessel has a central inner diameter of 2.0-2.3 mm.

The wall thickness of the discharge vessel may preferably be chosen to be 1.5-1.9 mm. According to a preferred embodiment, the wall thickness is 1.5-1.75 mm, so that a relatively small discharge vessel is provided, which has a reduced heat radiation and is therefore kept hot even at lower electrical powers.

According to a preferred embodiment of the invention the lamp further comprises an outer enclosure provided around the discharge vessel. The outer enclosure is preferably also made of quartz glass. The enclosure is sealed to the outside and may be evacuated to vacuum or filled with a gas filling, which preferably is provided at reduced pressure (pressure below 1 bar). The outer enclosure serves as insulation to provide a defined flow of heat to the outside, so that a defined operation temperature of the discharge vessel is achieved.

The enclosure may be of any geometry, e.g. cylindrical, generally elliptical or other. It is preferred for the outer enclosure to have an outer diameter of at most 11 mm.

In order to reduce the heat flow from the discharge vessel, the outer enclosure is provided at a certain distance therefrom. For the purposes of measurement, the distance discussed here is measured in cross-section of the lamp taken at a central position between the electrodes. The gas filling or evacuation of the outer enclosure is chosen, together with the distance, such that a desired heat transition coefficient $$\frac{\lambda}{d_2}$$

is achieved. Preferred values for $$\frac{\lambda}{d_2}$$

are 23.3-80 W/(m²K), further preferred are 32.6-62 W/(m²K). Preferably, the outer enclosure is arranged at a distance of 0.4-0.8 mm to the discharge vessel.

Further embodiments relate to the filling provided within the discharge vessel.

The rare gas provided in the discharge space is preferably Xenon. The rare gas may be provided at a cold (20° C.) filling pressure of more than 13 and less than 17 bar. Most preferably, a gas pressure of 14-16 bar is used. These pressure values provide high lumen output and help to achieve quick run-up behavior. However, pressure values of 17 bar or more have been found to negatively influence lifetime and are thus preferably avoided.

In a preferred embodiment, the metal halide composition is carefully chosen to achieve a high lumen output. The composition comprises at least halides of Sodium (Na) and Scandium (Sc), preferably at least 50 wt.-% total of NaI and ScI$_3$. Further preferred are even higher proportions of the strong light emitting halides NaI and ScI$_3$ of more than 60 wt.-% or even more than 70 wt.-% total of the halide composition. The mass ratio of the halides of Na and Sc is preferably (mass of Na halide divided by mass of Sc halide) 0.7-1.3, preferably 0.85-1.15.

In a further preferred embodiment, the metal halide composition comprises further ingredients besides halides of Sodium and Scandium. The further halides serve to adjust the burning voltage and to achieve a desired color of the light generated. According to a preferred embodiment of the invention, the metal halide composition is chosen to obtain—after 15 h of operation—a color temperature of 4250-4750 K, more preferred 4350-4650 K. To achieve this, the metal halide composition preferably comprises a small amount of halides of Indium (InI), e.g. 0.1-3 wt.-%, preferably 0.2-1 wt.-%. As another addition, it is preferred to add an amount of halides of Thulium (TmI$_3$), preferably 5-40 wt.-% of the total halide composition, preferably 10-30 wt.-%. The addition of halides of Thulium and Indium serves to adjust the color to the desired color temperature range.

Optionally, the metal halide composition may comprise a small addition (e.g. less than 5 wt.-%, preferably 0.5-3 wt.-%) of a Thorium halide, preferably ThI$_4$. Thorium halide serves to lower the work function of the electrodes and thus improves lamp efficiency.

In a preferred embodiment, the electrodes are rod-shaped with a diameter of 230-300 µm, preferred 240-260 µm. On one hand, the electrodes should be provided thick enough to sustain the necessary run-up current. On the other hand, electrodes for a lamp design with high efficiency at relatively low steady state power need to be thin enough to still be able to operate in steady state at low power and to heat the discharge vessel sufficiently.

BRIEF DESCRIPTION OF THE DRAWINGS

The above and other objects, features and advantages of the present invention will become apparent from the following description of preferred embodiments, in which.

DETAILED DESCRIPTION OF EMBODIMENTS

All embodiments shown and described are intended to be used for vehicle head lights, conforming to ECE R99 and ECE R98. This, specifically, is not intended to exclude alternative non-automotive use, or vehicle lighting according to other regulations.

Since automotive high pressure gas discharge lamp lighting assemblies are known per se, the following description of the preferred embodiments will primarily focus on the special features of the invention.

Figure 1:
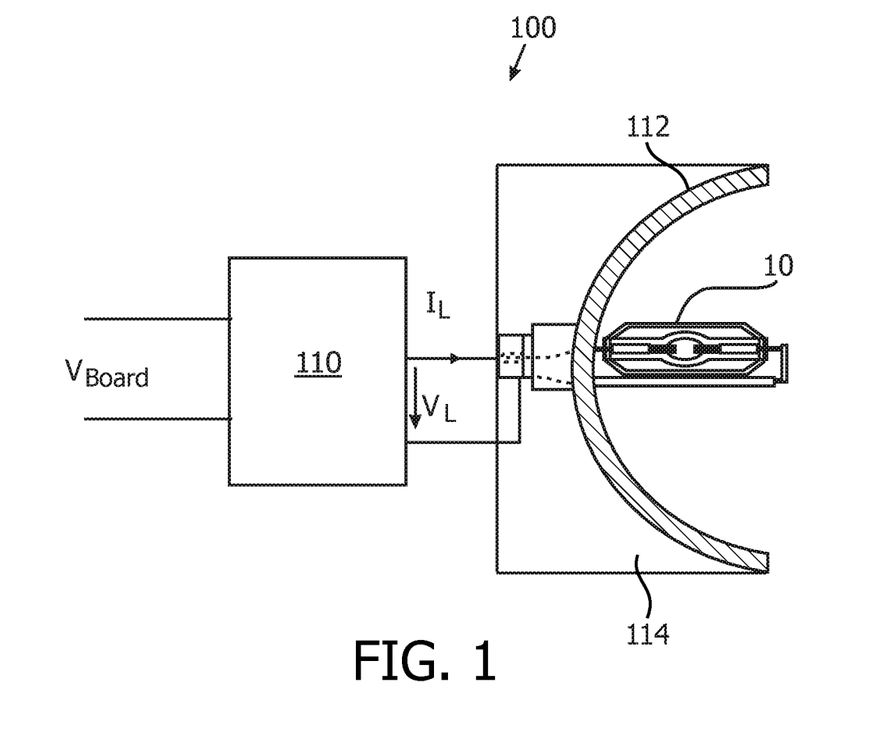
FIG. 1 shows a schematical representation of a lighting assembly according to an embodiment of the invention.

FIG. 1 schematically shows a lighting assembly 100 comprising an electronic driver circuit (ballast) 110 electrically connected to a lamp 10 mounted within a reflector 112 of a motor vehicle headlight 114.

It should be noted that the motor vehicle headlight 114 is only shown symbolically. Specific implementations of such headlights using high intensity discharge lamps, which may comprise further optical elements such as lenses, shading devices etc. are know per se to the skilled person.

The lamp 10 is a high intensity discharge lamp. The driver circuit 110 is connected to a vehicle's onboard voltage $V_{board}$. Within the circuit 110, this voltage is transformed such that the discharge lamp 10 is operated with a suitable lamp current $I_L$ and a lamp voltage $V_L$.

As the lamp 10 is started, the driver circuit 110 supplies an ignition voltage to the lamp 10 igniting an arc between electrodes thereof. Following ignition, the lamp 10 is first operated in a run-up phase, where initially only the lamp current $I_2$ is limited, e.g. at 2.0 A.

After run-up, the lamp 10 is operated in a steady state, where a lamp current $I_L$ and lamp voltage $V_L$ are supplied such that a constant average electrical power is delivered. In the present examples, the value of the average power will be 25 W, as compared to 35 W conventionally used in automotive front lighting today. While the lighting assembly 100, as will be explained in detail, is optimized for operation as 25 W, it will be appreciated by the skilled person that it may also be operated at different electrical powers below 35 W, e.g. 20-30 W or further preferred 22-28 W.

Figure 2:
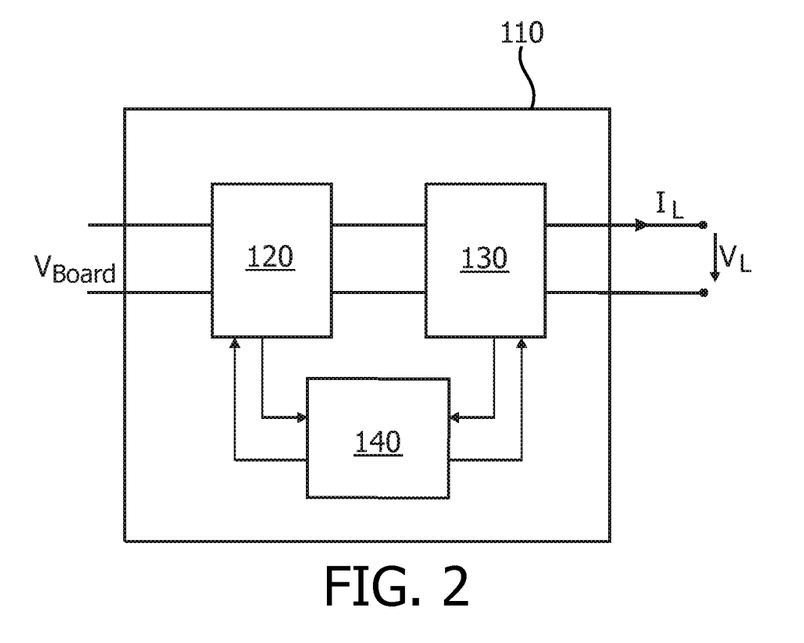
FIG. 2 shows a schematical representation of an electronic lamp driver circuit of the assembly of FIG. 1.
Figure 3:
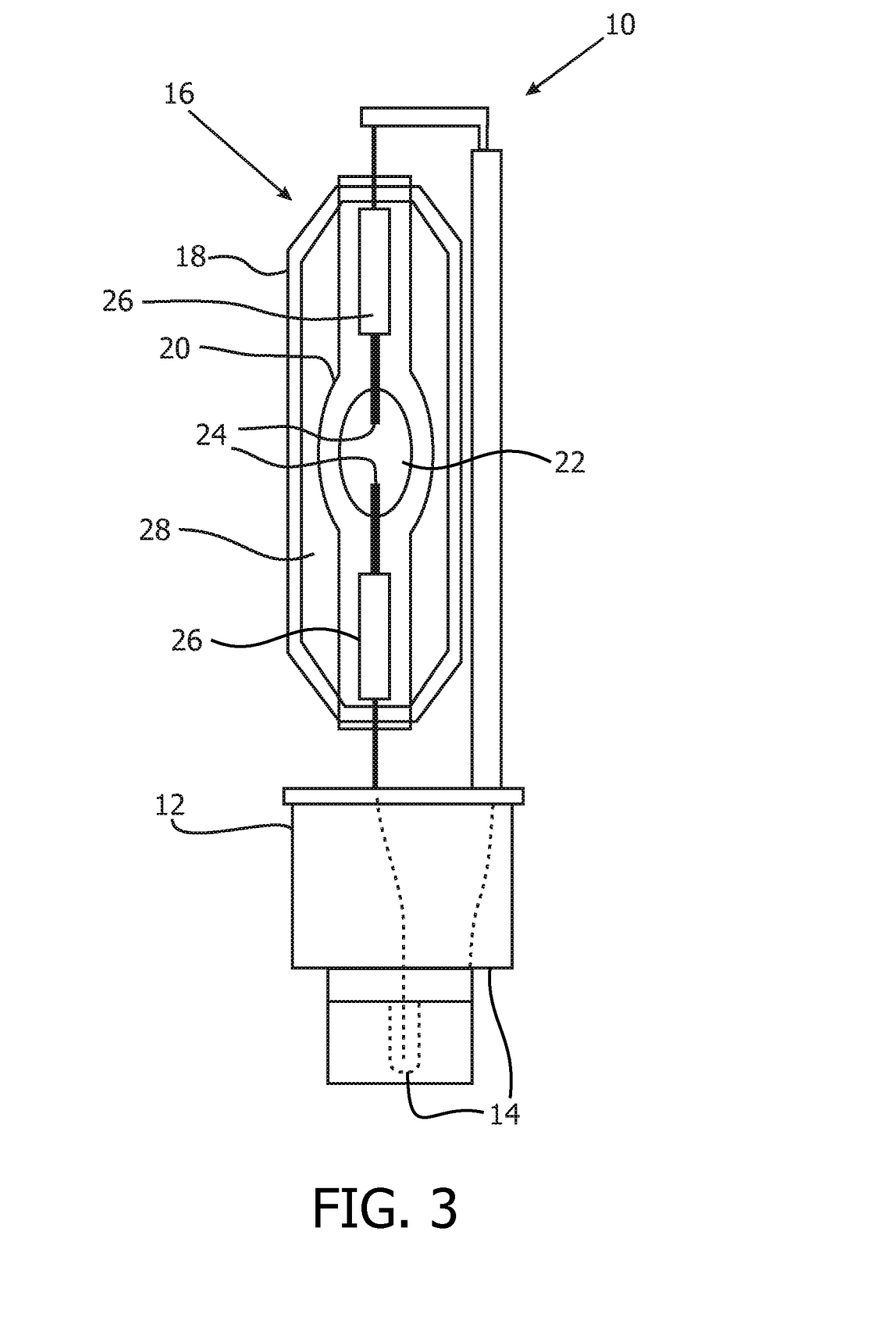
FIG. 3 shows a side view of a lamp.

FIG. 2 shows a schematic block diagram of driving circuit 110. Since the present invention focuses on efficiency of the lighting assembly 100 in steady state, only those elements of driving circuit 110 are represented and will further be explained which are responsible for driving the lamp 10 in steady state, whereas elements e.g. responsible for lamp ignition are not shown and will not be explained in detail.

In its general structure as shown in FIG. 2, the driving circuit 110 comprises a booster circuit 120, an inverter circuit 130 and a controller 140. Booster circuit 120 transforms the onboard voltage $V_{board}$ of a motor vehicle to an intermediate voltage of, in the present example, 400 V. Inverter circuit 130 uses switching elements, e.g. in a full bridge configuration, to supply an alternating current $I_L$ at a frequency of e.g. 250-750 Hz. In the present example, a current $I_L$ is supplied as an alternating current of 330 Hz. An example for a driving circuit is described in detail in WO 2006/137027 A2.

In steady state operation, the lamp is current driven, i.e. is operated with a desired current value $I_L$. A corresponding voltage value $V_L$ will be established according to parameters of the lamp 10. As such parameters change over the lifetime of the lamp 10, and the voltage $V_L$ adjusts accordingly, also the set values for $I_L$ will be changed by a power control loop (integrated in controller 140 and not specifically shown here) to obtain the desired constant average power value of e.g. 25 W.

Controller 140 drives the booster circuit 120 and the inverter circuit 130 accordingly.

In the embodiments of the invention, the driving circuit 110 supplies electrical power to the lamp as an alternating lamp current $I_L$ with a specific waveform. The lamp current $I_L$ has a basic waveform, which in the preferred embodiment is substantially rectangular, i.e. the current is substantially constant in each half period and rapidly changes at commutation. Superimposed on this basic waveform are pulses provided at time instants close to commutation of the basic waveform. The pulses are of short duration as compared to the total cycle time and the pulse height is such that the current in the pulse is noticeably higher than in the remaining cycle.

Figure 6:
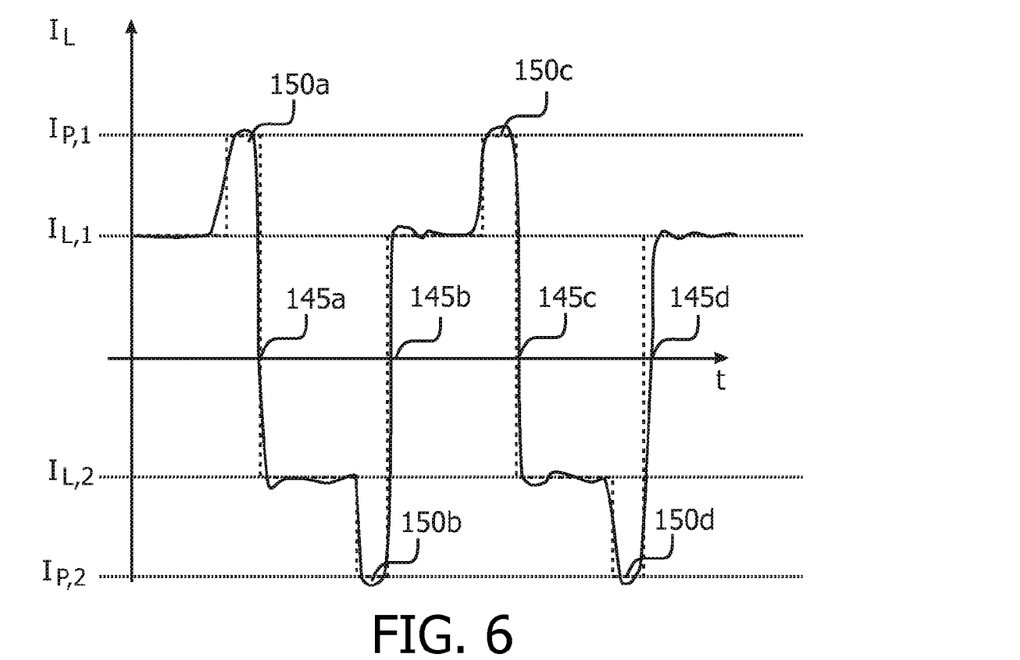
FIGS. 6, 7a-7c show timing diagrams of a lamp current.

FIG. 6 shows a timing diagram of an example of a waveform of the lamp current $I_L$ over time t in steady state operation. It should be emphasized that the timing diagram is not to scale, but is intended to clearly illustrate the values and definitions used.

In FIG. 6, a dashed line shows an ideal waveform of the lamp current $I_L$ and a solid line shows an example of a current $I_L$ that may realistically be obtained from the ballast 110.

As shown in FIG. 6, before each commutation 145a, 145b, 145c, 145d, a current pulse 150a, 150b, 150c, 150d is provided which is superimposed on the basic rectangular waveform. In the rectangular waveform, the current $I_L$ is substantially constant during each half period at a positive value $I_{L,1}$ and at a negative current value $I_{L,2}$. The superimposed pulses 150a-150d raise the current up to higher positive values $I_{P,1}$ and higher negative values $I_{P,2}$. The pulses 150a-150d are relatively short in comparison to the total cycle time. The pulse height is chosen such that $I_{P,1}$ and $I_{P,2}$ are at least 1.2 times the RMS value of the lamp current $I_L$ within the full cycle. Since the current pulses are short, the RMS value of $I_L$ will be only slightly above $I_{L,1}$. In the present example, the pulse $I_{P,1}$, $I_{P,2}$ is chosen to be about 1.5 times $I_{L,1}$ and $I_{L,2}$, corresponding to about 1.4 times the RMS value of $I_2$.

Figure 7A:
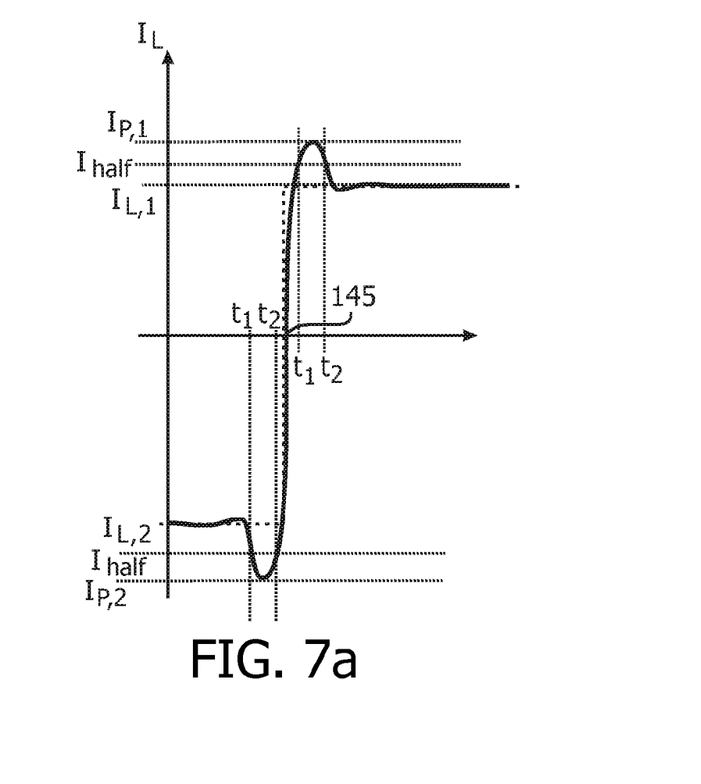
Figure 7B:
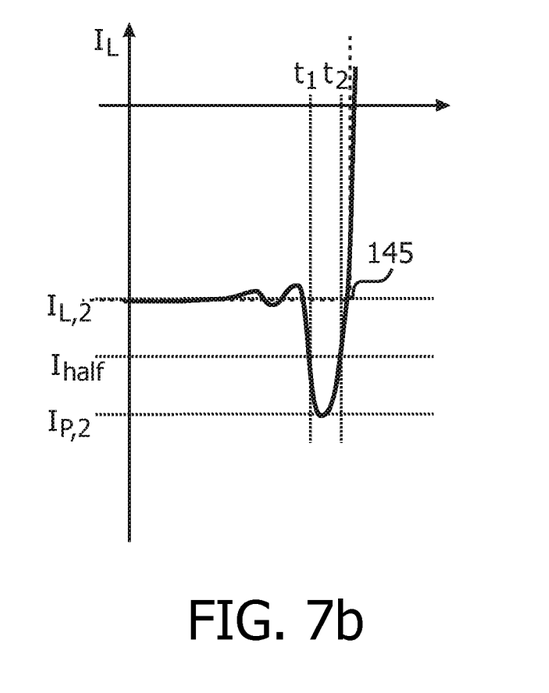
Figure 7C:
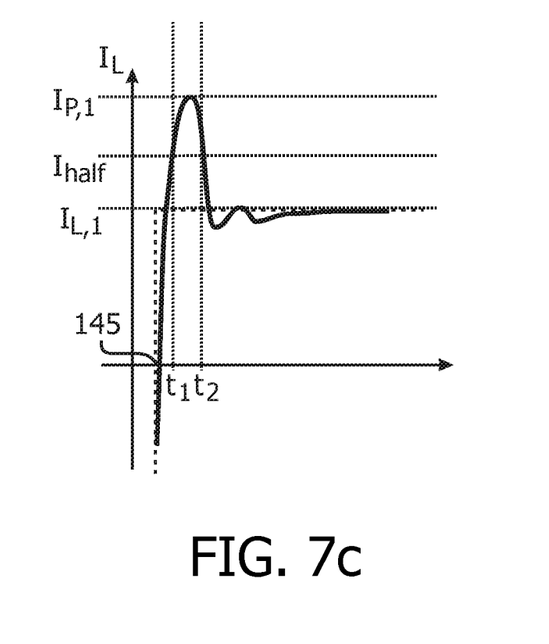

FIGS. 7a-7c show different pulses superimposed on the basic rectangular waveform. In each case, the pulse width and the location of the pulses in time is measured, as shown in FIG. 7a-7c at half maximum of the pulse, i.e. at the times $t_1$, $t_2$ where the value $I_L$ reaches $I_{half} = I_{L,1} + \frac{1}{2}(I_{P,1} - I_{L,1})$. As far as the present specification and claims make reference to the location in time of a pulse, this refers to the central point in time between the half maximum points $(t_1 + \frac{1}{2}(t_2 - t_1))$. If reference is made to a pulse duration, this refers to the time interval between the half maximum points $t_1$, $t_2$.

As illustrated in FIGS. 7a-7c, a pulse may be supplied before the commutation point 145 (FIG. 7b), after commutation (FIG. 7c), or both before and after commutation (FIG. 7a).

In the preferred embodiment, the current $I_L$ has a frequency of 330 Hz. The total cycle time is thus 3 ms. The pulse duration may preferably be 3 to 16% thereof, i.e. 90 to 480 μs.

The pulse center may be located in time either as shown in FIG. 7b before or, as shown in FIG. 7c after each commutation point 145, within a time interval of 20% of the half cycle time, i.e. +/−0.3 ms before/after commutation.

FIG. 1 shows a side view of the discharge lamp 10. The lamp 10 comprises a socket 12 with two electrical contacts 14 which are internally connected to a burner 16.

The burner 16 is comprised of an outer enclosure (in the following referred to as outer bulb) 18 of quartz glass surrounding a discharge vessel 20. The discharge vessel 20 is also made of quartz glass and defines an inner discharge space 22 with projecting, rod-shaped (i.e. cylindrical with circular cross-section) electrodes 24. The glass material of the discharge vessel 20 further extends in longitudinal direction of the lamp 10 to seal the electrical connections to the electrodes 24 which comprise a flat molybdenum foil 26.

The outer bulb 18 is, in its central portion, of cylindrical shape and arranged around the discharge vessel 20 at a distance, thus defining an outer bulb space 28. The outer bulb space 28 is sealed.

Figure 4:
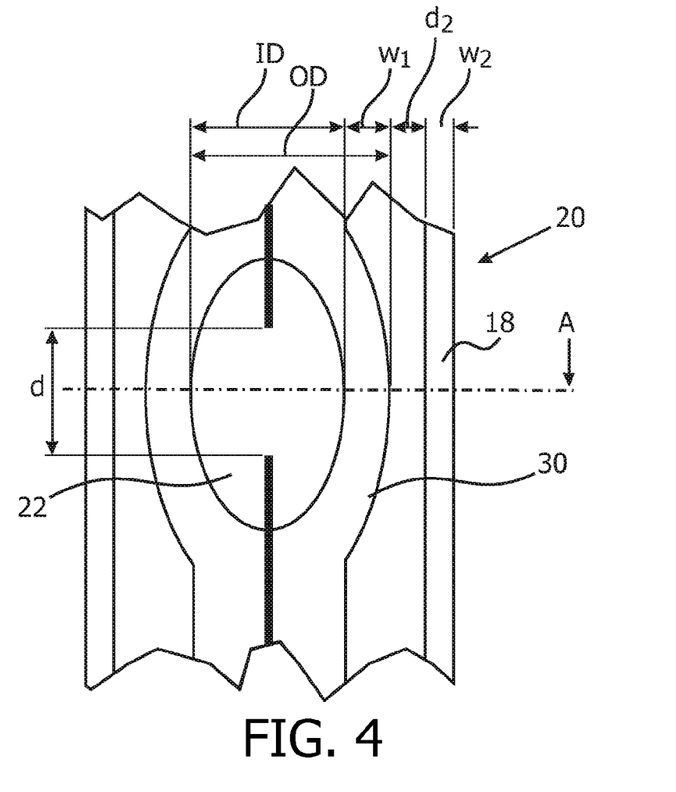
FIG. 4 shows an enlarged view of the central portion of the lamp shown in FIG. 1.

As shown in greater detail in FIG. 4, the discharge vessel 20 has an outer wall 30 arranged around the discharge space 22. The outer shape of the wall 30 is ellipsoid. The discharge space 22 in the example shown is also of ellipsoid shape. Alternatively, the discharge space 22 may be of cylindrical shape (not shown).

Figure 5:
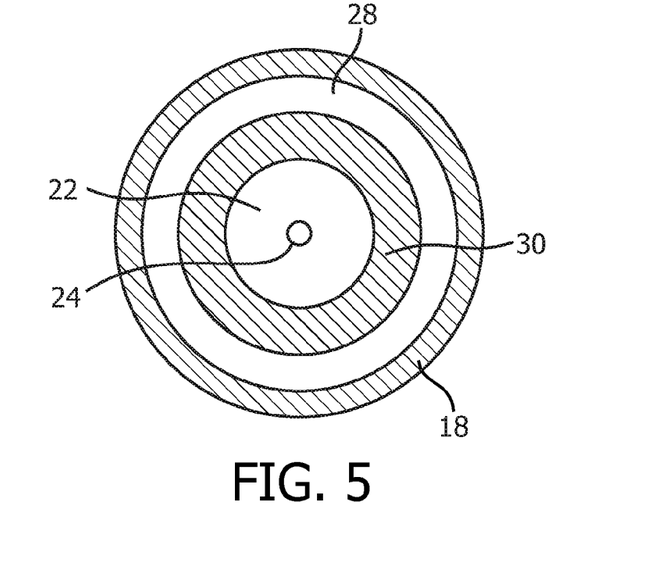
FIG. 5 shows a cross-sectional view along the line A in FIG. 2.

The discharge vessel 20 is characterized by the electrode distance d, the inner diameter ID and the outer diameter OD of the discharge vessel 20, the wall thickness $w_1$ of the discharge vessel 20, the distance $d_2$ between the discharge vessel 20 and the outer bulb 18 and the wall thickness $w_2$ of the outer bulb 18. Here, the values ID, OD, $w_1$, $d_2$, $w_2$ are measured in a central perpendicular plane of the discharge vessel 20, as shown in FIG. 5.

During operation of the lamp in steady state, as described above, an arc discharge is ignited between the electrodes 24. An alternating current $I_L$ is supplied, such that at a burning voltage $V_L$ establishing in steady state a constant average electrical power of 25 W is delivered.

The generation of visible light, and more specifically the luminous flux, measured in lumen generated by the lamp 10 is dependent on parameters both of the lamp 10 and on the electrical driving scheme.

One decisive parameter of the lamp 10 is the lamp filling comprised within the discharge space 22, which is free of mercury and includes metal halides as well as rare gas. Details of the filling will be discussed below. A further decisive parameter is the thermal design of the lamp 10.

Regarding the thermal behavior of a discharge lamp 10 as shown, it should be kept in mind that automotive lamps are intended to be operated horizontally, as shown in FIG. 1. The arc discharge between the electrode 24 will then lead to a hot spot at the wall 30 of the discharge vessel 20 above the arc. Likewise, opposed portions of the wall 30 surrounding the discharge space 22 will remain at comparatively low temperatures (coldest spot).

In order to reduce heat transport from the discharge vessel 20 to the outside, and to maintain high temperatures necessary for good efficacy, it is thus preferable to provide the outer bulb 18 with reduced heat conduction. In order to limit cooling from the outside, the outer bulb 18 is sealed and either evacuated or filled with a filling gas of defined heat conductivity. The outer bulb filling is provided at reduced pressure (measured in the cold state of the lamp at 20° C.) of less than 1 bar. As will be further explained below, the choice of vacuum or a suitable filling gas should be made in connection with the geometric arrangement in order to achieve the desired heat conduction from discharge vessel 20 to outer bulb 18.

The heat conduction to the outside may be roughly characterized by a heat transition coefficient $\lambda/d_2$, which is calculated as the thermal conductivity $\lambda$ of the filling of the outer bulb (which in the present context is always measured at a temperature of 800° C.) divided by the distance $d_2$ between the discharge vessel 20 and the outer bulb 18.

Due to the relatively small distance between the discharge vessel 20 and outer bulb 18, heat conduction between the two is essentially diffusive and will therefore be calculated as $\dot{q}=-\lambda\,\mathrm{grad}\theta$, where $\dot{q}$ is the heat flux density, i.e. the amount of heat transported per time between discharge vessel and outer bulb. $\lambda$ is the thermal conductivity and $\mathrm{grad}\theta$ is the temperature gradient, which here may roughly be calculated as the temperature difference between discharge vessel and outer bulb, divided by the distance:

$$\mathrm{grad}\theta = \frac{T_{dischargeVessel} - T_{outerBulb}}{d_2}.$$

Thus, cooling is proportional to $$\frac{\lambda}{d_2}.$$

In connection with the embodiments proposed in the present context, different types of filling gas, different values of filling pressure and different distance values $d_2$ may be chosen to obtain a desired transition coefficient $$\frac{\lambda}{d_2}.$$

In the case of a gas filling, the filling pressure is reduced (below 1 bar, preferably below 700 mbar, further preferred below 300 mbar). An especially preferred value is a filling pressure of 100 mbar. However, it has been found that in the preferred region the heat transition coefficient changes little with the pressure. Alternatively, the outer bulb may be evacuated up to pressure values below 12 mbar, preferably 8 mbar or below, or even 4 mbar or lower.

Preferred distances $d_2$ range from 0.4 to 0.8 mm. The filling may be any suitable gas, chosen by its thermal conductivity value $\lambda$ (measured at 800° C.). The following table gives examples of values for $\lambda$ (at 800° C.):

| | |
|---|---|
| Neon | 0.120 W/(mK) |
| Oxygen | 0.076 W/(mK) |
| Air | 0.068 W/(mK) |
| Nitrogen | 0.066 W/(mK) |
| Argon | 0.045 W/(mK) |
| Xenon | 0.014 W/(mK) |

To obtain good insulation, especially Argon, Xenon, or a mixture thereof is preferred as main constituent of the filling gas. However, since the heat transition coefficient is of course dependent on distance $d_2$, different gas fillings may also be chosen with a high enough $d_2$.

In the case of a vacuum of 8 mbar or below in the outer bulb, a thermal conductivity of about 0.045 W/(m²K) was observed.

Preferred values for $$\frac{\lambda}{d_2}$$

range from about 23 W/(m²K) (achieved e.g. by a Xenon filling at a distance of $d_2=0.6$ mm) to about 80 W/(m²K) (achieved e.g. by a filling comprised of 90% Argon and 10% Oxygen at a distance of $d_2=0.6$ mm). Further preferred is a range of 32.6 W/(m²K) to 62 W/(m²K).

To be able to propose lamp designs with overall high lumen efficiency, the inventors have studied factors contributing to lamp efficiency. The following parameters contribute to the efficiency and may be adjusted accordingly to obtain a higher efficiency. However, the parameters may negatively influence the lifetime of the lamp.

Discharge Bulb Filling:
   amount of metal halides: By raising the total amount of halides, and thus raising the amount of light emitting halides provided within the discharge vessel, the lamp efficiency is raised. However, a high amount of aggressive halides increases reactivity and could lead to earlier corrosion at the Mo-band sealing portions.
   metal halide composition:
   By raising the amount of strongly light emitting halides, such as halides of Sodium and Scandium, in contrast to secondary halides, such as halides of Thulium and Indium, the efficiency is raised. However, the color obtained may need to be adjusted by the secondary halides. In a metal halide composition with halides of Sodium and Scandium, the lamp efficiency is raised by choosing the mass ratio of Sodium halides and Scandium halides close to an optimal value of about 1.0.
      Rare gas pressure: By raising the pressure of the rare gas, preferably Xenon, provided in the discharge vessel, the lamp efficiency is raised. A rare gas filling pressure which is too high will however negatively influence the lifetime of the lamp, which is why the current invention proposes to limit the Xenon pressure within the discharge space 22 to less than 17 bar.
   Besides Scandium halide, it is possible to use Thorium halide as a gas phase emitter. While Thorium-free designs are preferable for environmental reasons, it has been found that the addition of ThI₄ may improve the lamp efficiency by reducing electro de losses.
   Thermal Measures: Raising "Coldest Spot" Temperature
   If the discharge vessel is made smaller, the "coldest spot" temperature is raised, contributing to a high efficiency. Consequently, a smaller inner diameter of the discharge vessel leads to a higher efficiency. However, the inner diameter ID should not be chosen too small to avoid excessive (mechanical and thermal) wall loads.
   The coldest spot temperature may further be raised by an insulation of the discharge vessel with an outer enclosure (outer bulb) to obtain a desired, low heat transition coefficient $$\frac{\lambda}{d_2}.$$

By providing the outer bulb at a greater distance $d_2$ from the discharge vessel, heat transfer is limited and the efficiency consequently raised. By providing a gas filling in the outer enclosure with low heat conductivity $\lambda$, such as Argon, and even further preferred Xenon, the transfer may be further reduced. However, an increased temperature may be detrimental to the lifetime behavior of the lamp.

As indicated, the above given parameters, if adjusted only to achieve a high efficiency, will have negative side effects with regard to other requirements of a lamp. In embodiments of the current invention, the above parameters are chosen to achieve the desired high lumen output, but also to limit further optimization in order not to incur unnecessary negative effects, such as limited lifetime.

Surprisingly, the inventors have found that the special pulse driving scheme described above significantly improves lamp efficiency. Experiments with lamps operated at 25 W have shown that the lumen efficiency increases by about 5%.

This increase in efficiency now allows to choose the lamp parameters such that not only high efficiency, but also a long lifetime and good run-up properties are achieved.

In the following, in accordance with the observations related above, embodiments of lamps will be discussed, which are intended to be used at a (steady-state) average level of operating power which is lower than prior designs. The nominal operating power of the embodiments is 25 W. The specific design is chosen with regard to thermal characteristics of the lamp in order to achieve high enough lamp efficacy with the proposed driving scheme, while at the same time preserving sufficient lamp lifetime.

As for as reference is made to lumen output and lamp efficiency, this in the present context is always to be measured at 25 W after a 45 min. burn-in procedure conducted with a horizontally oriented burner which is first started up and operated for 40 min, then turned off and rotated 180° around the on the longitudinal axis, turned on again and operated for a further 5 min before measurement of the lumen output. Since typically lamps are sold after having completed this burning sequence, this measure will be regarded rather than values measured after 15 h of operation as in some regulations. For comparison, it should be observed that the lamp efficiency initially decreases over lifetime.

In a first embodiment, the discharge vessel and outer bulb are provided as follows:

Example Lamp 1 (25 W)
Discharge vessel: ellipsoid or cylindrical inner shape ellipsoid outer shape
Electrodes: rod-shaped
Electrode diameter: 250 μm
Electrode distance d: 3.9 mm optical
Inner diameter ID: 2.2 mm
Outer diameter OD: 5.5 mm
Discharge vessel volume: 19 μA
Wall thickness $w_1$: 1.65 mm
Outer bulb inner diameter: 6.7 mm
Outer bulb distance $d_2$: 0.6 mm
Outer bulb filling: 85% Xenon, 5% Argon, 10% Oxygen at 100 mbar
Heat transition coefficient:

$$\frac{\lambda}{d_2} 36.25 \text{ W/(m}^2\text{K)},$$

measured at 800° C.
Outer bulb wall thickness $w_2$: 1 mm
The filling of the discharge space 22 consists of Xenon and a metal halide composition as follows:
Xenon pressure (at 25° C.): 15 bar
Halide composition: 41 wt.-% NaI, 36.5 wt.-% ScI₃, 20 wt.-% TmI₃, 2 wt.-% ThI, 0.5 wt.-% InI
Total amount of halides: 200 μg
Amount of halides per mm³ of the discharge space: 10.5 μg/μl
Mass ratio of NaI/ScI₃: 1.12

A batch of 10 lamps of the above example 1 was tested. First, the lamps were operated with an alternating current without superimposed pulses. Then, the electronic ballast 110 was programmed to provide the described current pulses close to the commutation. The following average measurements were obtained after operating the lamps for 45 minutes according to the burn-in sequence:

|  | conventional operation | pulse operation |
|---|---|---|
| Efficiency: | 88 lm/W | 92 lm/W |
| Voltage: | 39.9 V | 40.0 V |
| Color: | X 367 | X 368 |
| Color: | Y 371 | Y 374 |
| Color temperature Tc: | 4351 K | 4339 K |

It may thus first be observed, that even at an operating power of 25 W, a high lumen output is achieved by the proposed lamp design in both cases. Surprisingly, the lumen output is substantially increased up to 2300 lm by using the described pulse driving scheme. This mode of operation thus provides an increase in lumen efficiency of +4 lm/W. It should also be noted that the other properties of the lamp, such as burning voltage and color, do not substantially change due to pulse operation.

While the above values were taken after 45 min burn-in, the properties change during the initial operation time of the lamp. After 15 h of operation, which is the point in time regarded in many specifications, the lamp efficiency both for conventional and pulse operation decreases. Also, the burning voltage increases by comparison to the values after 45 min of operation.

Also, the color changes such that the desired color temperature above 4400 K is reached.

The observed surprising increase in lumen output for a discharge lamp operated with pulses close to commutation is not limited only to the disclosed type of lamp, but also applies to other discharge lamps driven at different operating power. Also for lamps driven at 35 W with conventional designs, i.e. a larger discharge vessel and a larger amount of halides therein, the same effect may be observed.

The above given parameters of example 1 were already chosen to obtain high efficiency, but at the same time avoid excessive ranges with strong negative influence on lifetime, but also on run-up behavior and color. However, due to the obtained increase in lamp efficiency resulting from pulse operation, variations of the above example may be defined as follows, where parameters are chosen at reduced values. This of course slightly reduces lamp efficiency, but is beneficial to the lamp in other fields:

Example 2 (25 W, Optimized Lifetime)
The discharge vessel and outer bulb dimensions are the same as in example 1. The following parameters were chosen differently from example 1:
Outer bulb filling: 45% Xenon, 45% Argon, 10% Oxygen at 100 mbar
Heat transition coeffient:

$$\frac{\lambda}{d_2} 56.9 \text{ W/(m}^2\text{K)},$$

measured at 800° C.
Total amount of halides: 100 µg
Amount of halides per mm³ of the discharge space: 5.26 µg/µl The total lumen output of the lamp of example 2 driven in the described pulse operation after 45 min was 2200 lumen, i.e. 88 lm/W. Thus, the lumen output in the second example, driven in pulse operation, is the same as that of the first example, driven in conventional manner. However, the design of example 2 has significant advantages with regard to lamp lifetime. The higher thermal conductivity of the outer bulb leads to a reduced colder spot temperature. This, together with the significantly reduced (50%) amount of halides within the discharge vessel results in decreased reactivity there, so that a longer lamp life may be obtained.

Example 3 (25 W, Fast Run-Up)
For the third example, all above discussed parameters were the same as in example 1, with the exception of the following parameters:
Outer bulb filling: 45% Xenon, 45% Argon, 10% Oxygen at 100 mbar
Heat transition coefficient:

$$\frac{\lambda}{d_2} 56.9 \text{ W/(m}^2\text{K)},$$

measured at 800° C.
Total amount of halides: 100 µg
Amount of halides per mm³ of the discharge space: 5.26 µg/µl
Xenon pressure at 25° C.: 16 bar The lamp of this third example, operated in the pulsed driving scheme for 45 min, had a lumen output of 2250 lumen, i.e. 90 lm/W. Due to the higher Xenon pressure, run-up behavior is better than in the above examples. Still, the lifetime of the lamp of example 3 is still good due to the reduced coldest spot temperature and significantly reduced amount of halides.

Example 4 (Thorium Free)
In a batch of lamps according to a fourth example, the above discussed parameters were chosen in accordance with the values given in example 1. The following parameters were chosen differently from example 1:
Total amount of halides: 100 µg
Amount of halides per mm³ of the discharge space: 5.26 µg/µl
Halide composition: 42 wt.-% NaI, 37.5 wt.-% ScI₃, 20 wt.-% TmI₃, 0.5 wt.-% InI The lamp of this fourth example, operated in the pulsed driving scheme, had a lumen output of 2225 lumen, i.e. 89 lm/W. Thus, the lamp of the fourth example is free of Thorium, which, although it is provided only in very small quantities, may be an environmental hazard. Still, the lamp according to the fourth embodiment has good lifetime properties due to the reduced amount of halides and still provides high luminous flux with an efficiency 1 lm/W higher than the lamp of example 1 if operated according to a conventional (non-pulsed) driving scheme.

Example 5 (Thorium Free, Quick Run-Up, Long Lifetime)
In a fifth example, the parameters were chosen as in example 1, with the following exceptions:
Outer bulb filling: 45% Xenon, 45% Argon, 10% Oxygen at 100 mbar Heat transition coefficient:

$$\frac{\lambda}{d_2} 56.9 \text{ W/(m}^2\text{K)},$$

measured at 800° C.
Total amount of halides: 100 µg
Amount of halides per mm³ of the discharge space: 5.26 µg/µl
Xenon pressure at 25° C.: 16 bar
Halide composition: 42 wt.-% NaI, 37.5 wt.-% ScI$_3$, 20 wt.-% TmI$_3$, 0.5 wt.-% InI The lamp of this fifth example, operated in the pulsed driving scheme, had a lumen output of 2200 lumen, i.e. 88 lm/W. Thus, the batch of lamps according to this fifth example provides a high luminous flux (equal to that of the lamp according to the first example, if driven conventionally), while being optimized at the same time for a long lifetime (due to the lower coldest spot temperature and halide amount) and for good run-up properties (due to the high Xenon pressure). Further, the lamp according to the fifth example is free of Thorium.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein the parameters are chosen differently within the intervals given in the appended claims.

Other variations to the disclosed embodiments can be understood and effected by those skilled in the art in practicing the claimed invention, from a study of the drawings, the disclosure, and the appended claims. In the claims, the word "comprising" does not exclude other elements, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed:

1. A lighting assembly including an electronic driver circuit and a discharge lamp connected to said driver circuit, where
said discharge lamp includes a discharge vessel where two electrodes are provided to project within said discharge vessel,
where said discharge vessel has a maximum inner dimension (ID), measured in a perpendicular central plane between said electrodes, of less than 3 mm,
where said discharge vessel encloses a filling comprising at least a rare gas and a metal halide composition, where said metal halide composition is provided in an amount per volume of the discharge vessel of less than 13.2 µg/µl,
and where said driver circuit -is disposed to deliver electrical energy to said discharge lamp with a steady-state average power of 20-30 W,
where said electrical energy is supplied as an alternating current ($I_L$), where superimposed on said alternating current ($I_L$) are
pulses occurring within each cycle of said alternating current($I_L$),
where said pulses have a center located in a time interval of 20% of a half cycle time after a polarity change of said alternating current,
where during said pulses a current ($I_L$) through said lamp reaches a current value of at least 1.2 times the RMS value of said alternating current ($I_L$).

2. The lighting assembly according to claim 1, where said metal halide composition is provided in an amount of less than 8 µg/µl.

3. The lighting assembly according to claim 1, where
said discharge lamp includes a sealed outer enclosure provided around said discharge vessel,
said outer enclosure enclosing a vacuum or gas filling having a thermal conductivity ($\lambda$)800° C.,
said outer enclosure arranged at a distance ($d_2$) from said discharge vessel, measured in said central plane, such that a heat transition coefficient ($\lambda/d_2$) calculated as said thermal conductivity ($\lambda$) divided by said distance ($d_2$) is 23.3-80 W/m²K.

4. The lighting assembly according to claim 3, where said heat transition coefficient ($\lambda/d_2$) is 32.6-62 W/m²K.

5. The lighting assembly according to claim 1, where said rare gas in said discharge vessel is Xenon provided at a cold pressure of more than 13 and less than 17 bar.

6. The lighting assembly according to claim 1, where said metal halide composition comprises halides of Sodium and Scandium in total of at least 50 wt.-%.

7. The lighting assembly according to claim 6, where said metal halide composition further comprises 0.1-3 wt.-% halides of Indium.

8. The lighting assembly according to claim 6, where said metal halide composition further comprises 5-40 wt.-% halides of Thulium.

9. The lighting assembly according to claim 6, where said metal halide composition further comprises 0.5-5 wt.-% halides of Thorium.

10. The lighting assembly according to claim 1, where said metal halide composition comprises at least halides of Sodium and Scandium,
where a mass ratio of the mass of halides of Sodium divided by the mass of halides of Scandium is 0.7-1.3.

11. The lighting assembly according to claim 1, where said metal halide composition is chosen to obtain a color temperature of 4250-4750 K.

12. The lighting assembly according to claim 1, where said lamp generates light with a lumen efficiency calculated as a ratio of an obtained luminous flux divided by an average electrical input power of more than 75 lm/W.

13. The lighting assembly according to claim 1, where said electrodes are rod-shaped with a diameter of 230-300 µm.

14. The lighting assembly according to claim 1, where said pulses have a pulse width of 1 to 25% of the half cycle duration.

15. A lighting assembly including an electronic driver circuit and a discharge lamp connected to said driver circuit, where
said discharge lamp includes a discharge vessel where two electrodes are provided to project within said discharge vessel,
where said discharge vessel has a maximum inner dimension (ID), measured in a perpendicular central plane between said electrodes, of less than 3 mm,
where said discharge vessel encloses a filling comprising at least a rare gas and a metal halide composition, where said metal halide composition is provided in an amount per volume of the discharge vessel of less than 13.2 µg/µl, and where said driver circuit —is disposed to deliver electrical energy to said discharge lamp with a steady—state average power of 20-30 W, where said electrical energy is supplied as an alternating current ($I_L$), where superimposed on said alternating current ($I_L$) are pulses occurring within each cycle of said alternating current ($I_L$), where said pulses have a center located in a time interval of 20% of a half cycle time after a polarity change of said alternating current, where during said pulses a current ($I_L$) through said lamp reaches a current value of at least 1.2 times the RMS value of said alternating current ($I_L$), and where said time interval is 0.3 ms.

* * * * *